Dec. 5, 1939.　　　S. A. CIECHANOW　　　2,182,514
FILM VIEWER
Filed Dec. 2, 1938
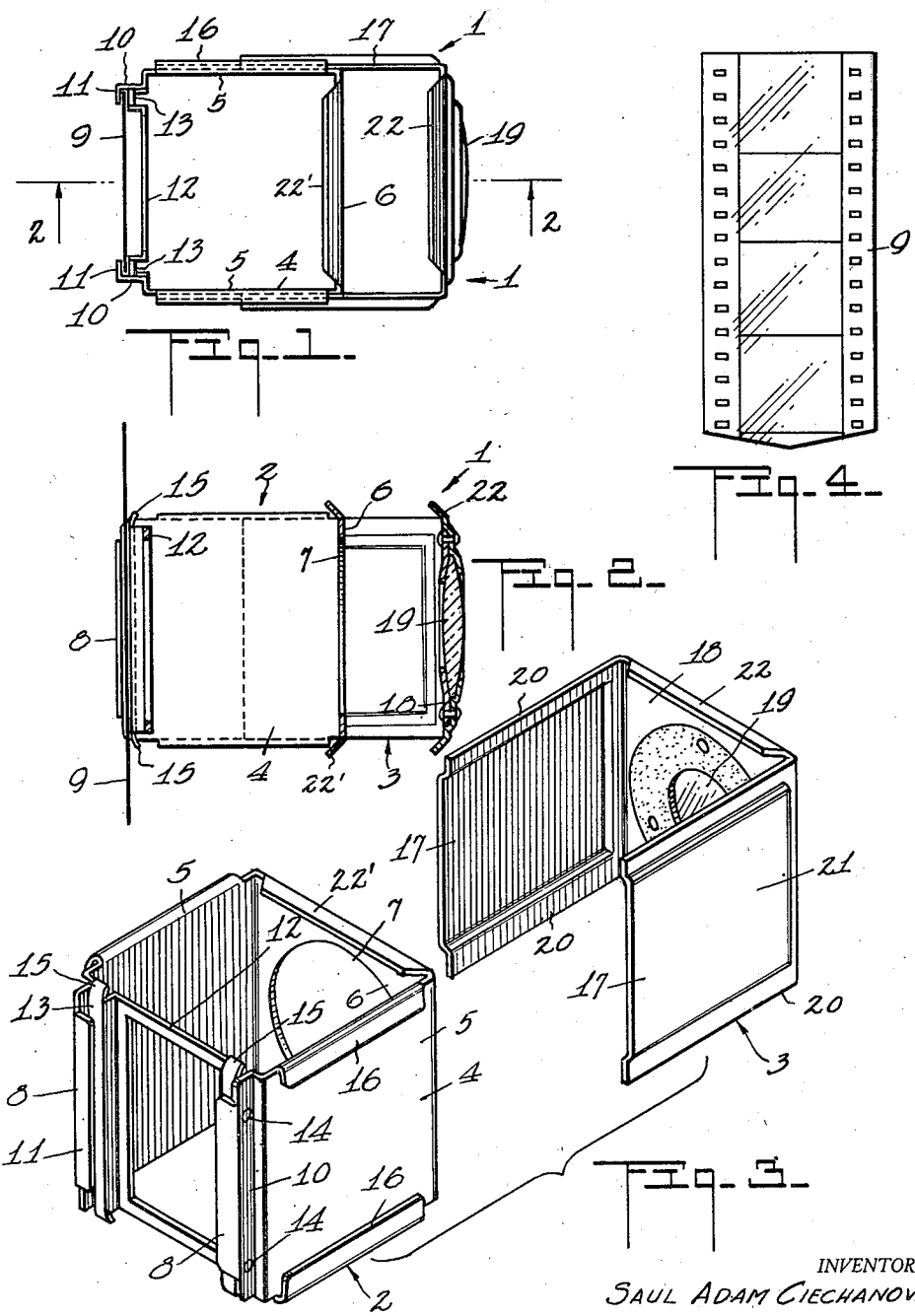
INVENTOR.
SAUL ADAM CIECHANOW.
BY Schapp & Cole
ATTORNEYS.

Patented Dec. 5, 1939

2,182,514

UNITED STATES PATENT OFFICE 2,182,514

FILM VIEWER

Saul Adam Ciechanow, San Francisco, Calif.

Application December 2, 1938, Serial No. 243,577

9 Claims. (Cl. 88—39)

The present invention relates to improvements in a film viewer, that is, an apparatus through which the individual pictures on a continuous film may be readily examined under a magnifying glass for the discovery of imperfections or determination of the condition, character and general properties of the film.

The principal object of the invention is to provide a film viewer of the character described that is exceedingly simple in construction, easy and economical in manufacture, may be readily adjusted and can be sold in the market at a small price so as to lend itself particularly to use by amateurs.

A further object of my invention is to provide for a structure well braced and well balanced so that, in spite of cheapness in construction and lightness in weight, it will offer considerable resistance to bending and breaking stresses and strains and will stand a considerable amount of wear and tear in ordinary usage.

A still further object of the present invention is to provide certain structural features improving the apparatus generally and facilitating the operation and adjustment thereof.

Further objects and advantages of my invention will appear as the specification proceeds.

The preferred form of the invention is illustrated in the accompanying drawing in which:

Figure 1 shows a plan view of my apparatus;

Figure 2 a vertical section taken along line 2—2 of Figure 1;

Figure 3 a perspective view showing the two main parts of my apparatus separately and in position for engagement, and Figure 4 a front view of a film adapted to be used in my apparatus.

While I have shown only the preferred form of my invention I wish to have it understood that various changes or modifications may be made within the scope of the claims hereto attached without departing from the spirit of the invention.

In its preferred form, my apparatus 1 comprises two sections 2 and 3, the former being the film mounting means and the latter the lens mounting means which is adapted for telescoping engagement over the former.

The film mounting means is made in the form of an open-ended, rectangular box 4 having side walls 5, a rear wall 6 provided with a large opening 7 and guide-ways 8 for a film 9 along the front edges of the side walls so as to cooperate with the film in forming the front of the box.

The structural features of the guide-ways are as follows: The front marginal sections of the side walls 5 are indented inwardly to form registering steps 10 which terminate in inwardly turned, confronting flanges 11. A front wall 12, formed with an opening to take in two standard motion picture frames so universally used today in miniature photography, has its side edges turned to form channels 13, which may be clampingly engaged between the steps 10 of the side walls. Suitable securing means, such as small rivets 14 may be employed to hold the channels in place and they are positioned to effect a small spacing between the bottoms of the channels and the flanges 11 to provide the guide-ways 8 for the film previously referred to.

It will be noted, particularly from Figures 2 and 3 that the bottoms of the channels extend lengthwise slightly beyond the flanges and are curved away from the latter as shown at 15 to facilitate insertion of the film between the guide-ways.

The channels cause the body portion of the front wall to be spaced from the main portion of the film so as to save the latter from injury, and the front wall at the same time serves as a means for closing the whole structure whereby the entire apparatus is strengthened.

The top and bottom edges of the side walls are turned upon the walls to provide channels 16 for slidably receiving the side members 17 of the lens mounting means 3, which latter comprises a rear member 18 substantially co-extensive in dimensions to the rear wall 6 of the film mounting means, a lens 19 mounted in the rear member and side members 17 previously referred to.

It will be noted that the channel-engaging upper and lower margins 20 of the side members are slightly off-set relative to the body portions 21 of said members to allow a certain amount of clearance between the latter and the side walls of the film mount when section 3 is telescoped upon section 2.

The top and bottom edges of the rear walls 18 and 6 are formed with slantingly projecting flanges 22 and 22' which extend over one another when the two sections are fully engaged and furnish convenient grips between fingers and thumb of the hands for the initiation of a separating movement. These grips are subsequently used for further adjustments in operation.

The manner of using my apparatus is readily apparent. The film to be examined is guided into the guide-ways 8, which engage with the edges of the film and leave the picture sections freely exposed. The lens is brought into focus by adjusting the lens mounting means relative to the film mounting means. This is accomplished by a mere forward or backward movement of the lens mounting means.

The engagement between the margins 20 of the side members 17 and the channels 16 of the side walls offers sufficient frictional resistance to cause the two sections to remain in any position to which they may have been adjusted.

I wish to point out that my apparatus 1 may be used for examining a film having width greater than that illustrated in Figure 4. In such a case, the flanges 11, which are flat and unobstructed, are placed against the surface of the film and serve as runners, whereby the apparatus may be moved from place to place over the film surface.

I claim:

1. In a film viewer of the character described, a film mounting comprising an open-ended, rectangular frame structure including parallel side walls having registering inward steps at the front margins and having registering flanges extending inwardly from the steps in spaced relation to one another, a front member having its side edges adapted to be clampingly received between the steps of the side walls and means for securing the front member upon the steps in slightly spaced relation to the flanges so as to have the front member and the flanges form guide ways for the marginal sections of a film or the like, the main portion of the front member being offset relative to the side sections thereof so as to be spaced from the main portion of the film.

2. In a film viewer of the character described, a film mounting comprising an open-ended, rectangular frame structure including parallel side walls having registering inward steps at the front margins and having registering flanges extending inwardly from the steps in spaced relation to one another, a front member having its side edges adapted to be clampingly received between the steps of the side walls and means for securing the front member upon the steps in slightly spaced relation to the flanges so as to have the front member and the flanges form guide ways for a film or the like, the top and bottom ends of the front member being made to project lengthwise beyond the ends of the flanges and being rounded away from the flanges to facilitate insertion of a film into the guide way and to effect an easy sliding motion.

3. In a film viewer, a film mounting including a rectangular frame having parallel side walls and front guide-ways arranged in confronting relation to slidably receive a film therein, the guide-ways being made to engage with the marginal sections of the film and leaving the main portion of the film exposed, whereby a person may examine the film while looking through the film toward light, two opposing ends of the side walls being turned upon themselves to form parallel and registering channels and a substantially U-shaped lens mounting having side members adapted to telescope with respect to the sides of the film mounting and to be slidably received in the said channels, the lens mounting having a lens therein through which the film may be viewed.

4. In a film viewer, a film mounting including a rectangular frame having parallel side walls and front guide-ways arranged in confronting relation to slidably receive a film therein, the guide-ways being made to engage with the marginal sections of the film and leaving the main portion of the film exposed, whereby a person may examine the film while looking through the film toward light, the two opposing ends of the side walls being turned upon themselves to form parallel and registering channels and a substantially U-shaped lens mounting having side members adapted to telescope with respect to the sides of the film mounting and to be slidably received in the said channels, the lens mounting having a lens therein through which the film may be viewed, the channel-engaging portions of the side members being off-set relative to the body portions of said members to provide clearance between said body portions and the side walls of the film mounting.

5. In a film viewer, a film mounting including a rectangular frame structure having parallel side walls, an apertured rear wall and coacting guide-ways for slidably receiving a film, the guide-ways being made to engage with the marginal sections of the film and leaving the main portion of the film exposed, whereby a person may examine the film while looking through the film toward light, a lens mounting including a rear wall and side members adapted for telescoping with respect to the side walls of the frame structure and guide means for guiding the side members relative to the side walls to adjust said rear walls between positions of close proximity and of spaced relation, the rear walls of both the film and lens mountings having flanges projecting from two opposing ends of said rear walls to furnish hand grips for effecting relative spacing of the rear walls.

6. In a film viewer of the character described, a film mounting comprising a frame structure having side walls, registering flanges extending inwardly from the side walls in spaced relation to one another, an apertured front member having its side edges secured to said side walls in slightly spaced relation to the flanges and parallel to the latter so as to have the front member and the flanges form guideways for the marginal sections of a film or the like, the front member spacing said side walls apart and the main portion of the front member being offset relative to the side sections thereof so as to be spaced from the main portion of the film.

7. In a film viewer of the character described, a film mounting comprising a frame structure having side walls, registering flanges extending inwardly from the side walls in spaced relation to one another, an apertured front member having its side edges secured to said side walls in slightly spaced relation to the flanges and parallel to the latter so as to have the front member and the flanges form guideways for the marginal sections of a film or the like, the front member spacing said side walls apart and the main portion of the front member being offset relative to the side sections thereof so as to be spaced from the main portion of the film, two opposing ends of the front member being made to project lengthwise beyond the ends of the flanges and being rounded away from the flanges to facilitate insertion of the film or the like into the guideway and to facilitate an easy sliding motion.

8. In a film viewer of the character described, a film mounting comprising a frame structure having side walls, registering flanges extending inwardly from the side walls in spaced relation to one another, an apertured front member having its side edges secured to said side walls in slightly spaced relation to the flanges and parallel to the latter so as to have the front member and the flanges form guideways for the marginal sections of a film or the like, the front member spacing said side walls apart and two opposing ends of the front member being made to project lengthwise beyond the ends of the flanges and being rounded away from the flanges to facilitate insertion of the film or the like into the guideway and to effect an easy sliding motion, said side walls also projecting endwise beyond opposing ends of the flanges to limit lateral movement of the film during the insertion thereof into the guideways.

9. In a film viewer of the character described, a film mounting comprising a frame structure having side walls, registering flanges extending inwardly from the side walls in spaced relation to one another, an apertured front member having portions paralleling the flanges and spaced therefrom to form guideways for the marginal sections of a film or the like, the front member spacing said side walls apart, the main portion of the front member being offset relative to the film-guiding portions thereof so as to be spaced from the main portion of the film or the like, and both ends of each guideway being open, whereby the entire length of the film or the like may be drawn through the guideway.

SAUL ADAM CIECHANOW.